(12) United States Patent
Archer

(10) Patent No.: US 8,154,894 B1
(45) Date of Patent: Apr. 10, 2012

(54) MULTIPLE VOLTAGE DC TO DC RESONANT CONVERTER

(75) Inventor: Michael Archer, Westlake Village, CA (US)

(73) Assignee: ERP Power, LLC, Moorpark, CA (US)

( * ) Notice: Subject to any disclaimer, the term of this patent is extended or adjusted under 35 U.S.C. 154(b) by 543 days.

(21) Appl. No.: 11/580,554

(22) Filed: Oct. 13, 2006

Related U.S. Application Data

(60) Provisional application No. 60/727,085, filed on Oct. 13, 2005.

(51) Int. Cl.
*H02M 7/217* (2006.01)
*H02M 3/335* (2006.01)

(52) U.S. Cl. ............. 363/127; 363/21.02; 323/267

(58) Field of Classification Search .......... 363/21.02, 363/21.06, 21.14, 69, 127; 323/267
See application file for complete search history.

(56) References Cited

U.S. PATENT DOCUMENTS

| | | | | |
|---|---|---|---|---|
| 5,946,207 A | * | 8/1999 | Schoofs | 363/127 |
| 6,219,264 B1 | * | 4/2001 | Drobnik | 363/127 |
| 6,262,905 B1 | * | 7/2001 | Zhang et al. | 363/127 |
| 6,288,919 B1 | * | 9/2001 | Jain | 363/89 |
| 6,504,267 B1 | * | 1/2003 | Giannopoulos | 307/31 |
| 6,961,253 B1 | * | 11/2005 | Cohen | 363/89 |
| 7,304,867 B2 | * | 12/2007 | Usui | 363/21.06 |
| 7,408,796 B2 | * | 8/2008 | Soldano | 363/127 |

\* cited by examiner

*Primary Examiner* — Gary L Laxton
(74) *Attorney, Agent, or Firm* — Cislo & Thomas LLP

(57) ABSTRACT

A resonant DC to DC converter circuit receiving an input voltage and capable of delivering multiple output voltages, while maintaining excellent cross-regulation with only one power transformer. The circuit of the invention uses trailing edge modulation, along with a new amplitude modulation arrangement which allows for the use of resonance with synchronous rectification and only a single power transformer. Thus, the circuit provides for DC to DC conversion, as well as an amplitude modulation arrangement.

3 Claims, 5 Drawing Sheets

MULTIPLE VOLTAGE DC TO DC RESONANT CONVERTER

RELATED APPLICATION

This application is based on and claims for priority the filing date of my U.S. Provisional Patent Application Ser. No. 60/727,085, filed Oct. 13, 2005, for Multiple Voltage DC to DC Resonant Converter, the full contents of which are incorporated herein by reference.

BACKGROUND OF THE INVENTION

1. Field of the Invention

This invention relates in general to certain new and useful improvements in circuit arrangements for providing multiple output voltages from a single input voltage, with only a single power transformer, as well as a circuit arrangement which uses trailing edge modulation for providing amplitude modulation and, again, only with a single power transformer. The circuit more preferably provides the amplitude modulation with resonant synchronous rectification using this single power transformer. Specifically, the converter circuit is used in combination with the amplitude modulation circuit arrangement to provide a single DC to DC converter circuit.

2. Brief Description of Related Art

New requirements mandating minimum operating efficiencies are now requiring AC to DC power supplies to deliver usable voltages to modern computer systems under various load conditions, while maintaining minimum efficiencies of greater than eighty percent. While power supplies capable of performing this feat have been available for some time, the costs of multiple power supplies in mainstream applications have caused some difficulty in their utilization.

Previous power supplies utilized for this high efficiency application have, many times, been resonant in nature. However, these prior art power supplies have required multiple power transformers to deliver the necessary voltages to the downstream loads. This multiple transformer approach, while effective at solving some of the technical issues associated with multiple output resonant power supplies, add significant cost to the design, as well as impacting the density due to the additional power transformer requirements. Additionally, prior art approaches to multiple output resonant power supplies have suffered from high line frequency ripple components in the DC outputs, due to the lack of gain in the prior art techniques.

Prior art resonant converters overcome the widespread loading and cross-loading and the changing resonating inductance issue by utilizing two power transformers, one for the 12 volt output and one for the 5 Volt and 3.3 Volt outputs. Since the 5 Volt and 3.3 Volt outputs are very close to each other in magnitude, it is possible to live with the different reflected leakage inductance without too much difficulty. The 12 Volt power transformer however, is a separate transformer with a separate resonant tank to accomplish a balanced resonant network for both of the transformers.

This new approach solves this need for multiple transformers and the resultant dilemma which is created. The invention, in one major aspect utilizes a new technique called trailing edge modulation. This trailing edge modulation approach, coupled with another major aspect of the invention namely, a new amplitude modulation scheme, allows the use of resonance with synchronous rectification coupled with one single power transformer. This allows for a lower cost approach than conventional low efficiency power supplies which are utilized today.

OBJECTS OF THE INVENTION

It is, therefore, one of the primary objects of the present invention to provide a DC to DC power supply capable of efficiently providing multiple outputs and which does not suffer high losses or high line frequency ripple components.

It is another object of the present to provide a circuit arrangement in which a DC to DC power supply can issue multitudes such as three volt, five volt and twelve output volts to choose without using a driver based on a timing arrangement for setting the output time and without reversing the current by use of the technique of trailing edge modulation.

It is another important object of the present invention to provide a DC to DC power supply circuit in which resistance of a transistorized switching element can be controlled through modulation of the amplitude of the signal, and allow for an output which is completely regulated without the need of an expensive regulating circuit.

It is another salient object of the present invention to provide a method of regulating a DC to DC power supply to provide multiple voltage outputs without generation of significant losses or high line frequency ripple components.

It is yet another important object of the present invention to provide a DC to DC power supply enabling a completely controlled and regulated output without the need of separate regulating circuitry.

With the above objects in view, my invention resides in the novel features of form, construction, and arrangement in combination of components forming part of the circuit presently described and pointed out in the claims.

BRIEF SUMMARY OF THE INVENTION

In conventional resonant converter designs, the leakage inductance of the transformer is utilized as the resonating inductance. This is a low cost way of generating a resonating inductor and it works very well. Unfortunately, the leakage inductance value is a function of the secondary winding coupling. This means that the secondary windings have different turn ratios, which is common and expected in normal power supply design. This also means that the transformers have very different primary leakage inductances, depending on which winding is conducting current.

In normal high volume applications like desktop computers, the required voltages for computer operation are 3.3 volts, 12 volts and 5 volts. This varying secondary voltage means that there will be very significant changes in reflected leakage inductance when it comes to the resonating inductance. This is caused by the fact that the coupling between the primary windings and secondary windings is a function of the turn's ratio. The larger the turn's ratio, the higher the uncoupled flux, or leakage flux, in the transformer.

In current applications regarding resonant power supplies, this reflected leakage inductance problem causes the primary resonating inductance to change, depending on which output is loaded (3.3 Volts or 5 Volts or 12 Volts). In reality, the loading is widespread with a substantial amount of cross-loading. However, it is apparent that any circuit design requires the resonant circuit to remain operational under most conditions of cross loading.

The new invention utilizes a new and novel technique to allow the resonant circuit to remain in a synchronized state, regardless of the fact that there is only one transformer and the reflected leakage inductance is varying by an order of over two to one. This is accomplished by utilizing a new technique called trailing edge modulation. In this technique, at least one or more synchronous field effect transistors (sometimes "FET's, or "FET switching elements") are used. Each output of the transformer, described herein and namely the 3.3 Volt, the 5 Volt or the 12 Volt output has a circuit that terminates the operation of the synchronous field effect transistors when the current in the synchronous transistors begins to turn negative regardless of the load. This means that the cross-load can be any combination, heavy 3.3 and light 12 volt, or heavy 12 volt and light 3.3V and still, the primary current remains a composite sine wave made up of each independent frequency reflected from the secondary. Thus, the outputs remain in regulation and substantially sinusoidal at all times.

Since the synchronous transistors are being used for rectification, it is now possible to add an amplitude/modulation loop, in the form of an inner loop, to the synchronous FET transistorized drive without disturbing the resonant loop. This allows this new inner loop, namely, the amplitude modulation loop, to control the light load regulation by modulating the channel resistance of the synchronous Mosfet transistors from their fully saturated resistance of about six milliohms, to a maximum voltage drop of one diode which is the intrinsic body diode of each Mosfet transistor herein. This added loop greatly enhances the cross regulation characteristics of the circuit of the invention for virtually free, since the synchronous drive is already available to allow proper rectification of the current.

In substance, and one of the important aspects of the invention is that there is a drive for a resonating converter with multiple output windings, and each winding presenting a different multiple voltage at that winding. In effect, this arrangement constitutes a DC to DC resonant converter with multiple output windings having different turn ratios. As a simple example, there will be a 5 Volt winding, a 12 Volt winding and possibly a 3.3 Volt winding. Other voltage output windings could also be provided.

There is, in effect, an outer loop, which is a resonant synchronous resonance loop, and an inner loop, which is an amplitude modulation loop in the resonant circuit of the invention. The synchronous resonance loop is driven by at least one field effect transistor, usually a pair of field effect transistors and up to four Fets.

Conventional resonant frequency converters frequently will use a fixed timer which can set the output time on synchronous field effect transistors. The problem with the fixed timer is that you cannot stop the reversing cycle and this can be a large problem with a power supply. To solve this problem, the circuit of the present invention uses an arrangement identical to trailing edge modulation to shut down each of the synchronous transistors at the proper time, that is when they are no longer able to conduct backwardly. In this way, the resonant converter will change its frequency and there will be no need for voltage blocking. The synchronous transistors also do not need any diodes and they will turn off at the proper times.

Another important aspect of the present invention is that when the synchronous field effect transistors are turned on, there is always an intrinsic diode across the drain source. When the field effect transistors are required to be turned on, the intrinsic diode is always forwardly and properly biased so that the voltage comes up, and this turns on each such diode. When the transistor is turned on, the voltage of that transistor drops to the voltage drop across a resistor in circuit with that transistor, and which is a five milliohm resistor. The resistance of this resistor is much lower than the forward voltage of the diode. In this way, the efficiency of the entire circuit is substantially improved.

Due to the fact that the invention does not use power diodes which have large losses, it is possible to modulate the amplitude of the drive to these transistors so that the resistance of the transistors can be controlled from five milliohms to about one megaohm (at full saturation). In essence, the invention enables one to obtain complete control of the outputs, making the invention a regulated circuit, without the need for a expensive components.

In the approach commonly used in the prior art, when the voltage increases on the field effect transistors, a comparator is provided, and which operates as a one-shot, providing a timing control. This will turn off the transistors at a proper pre-set time. Moreover, the transistors will be turned off before the voltage reverses. The current may still be positive in the transistor and this is equivalent to the drive used on the multiple output voltage transformer of the invention. When the timer is effectively turned off, the current in the field effect transistor can go negative. In essence, the current will start to move in a reverse direction and discharge the output back into itself. The problem with the timing arrangement just described, is that if the current becomes negative, it can stay negative and visa versa. Thus, this is not really an operative condition. This problem was solved in the prior art by use of more than one power transformer. In other words, the transformer for a 12 Volt output transforms, then transforms for a 5 Volt output and then transforms for a 3.3 Volt output.

In the present invention, trailing edge modulation is used, as aforesaid. Thus, as the secondary voltage of the field effect transistor is increasing, if there is a slight decrease in voltage, that means the resonant cycle for that output is over. It does not mean that the timer voltage is reversed. In the circuit of the invention, each transistor has its own driver and its own comparative circuit. There is no need for a fixed timer. In this way, there is effectively a separate timing signal for the 3.3 Volt winding, a separate signal for the 5 Volt winding and one for the 12 Volt winding. In effect, this is trailing edge modulation because the trailing edge is modulated where it needs to be.

This present invention thereby provides a unique and novel multiple voltage DC to DC resonant converter which is a unitary transformer operated resonant converter, and which thereby fulfills all of the above-identified objects sought therefor. These and other objects which will become more fully apparent from a consideration of the forms in which they may be embodied. One of these forms is more fully illustrated in the accompanying drawings and described in the following detailed description of the invention. However, it should be understood that the accompanying drawings and this detailed description are set forth only for purposes of illustrating the general principles of the invention and are not limiting.

BRIEF DESCRIPTION OF THE DRAWINGS

Figure 1:
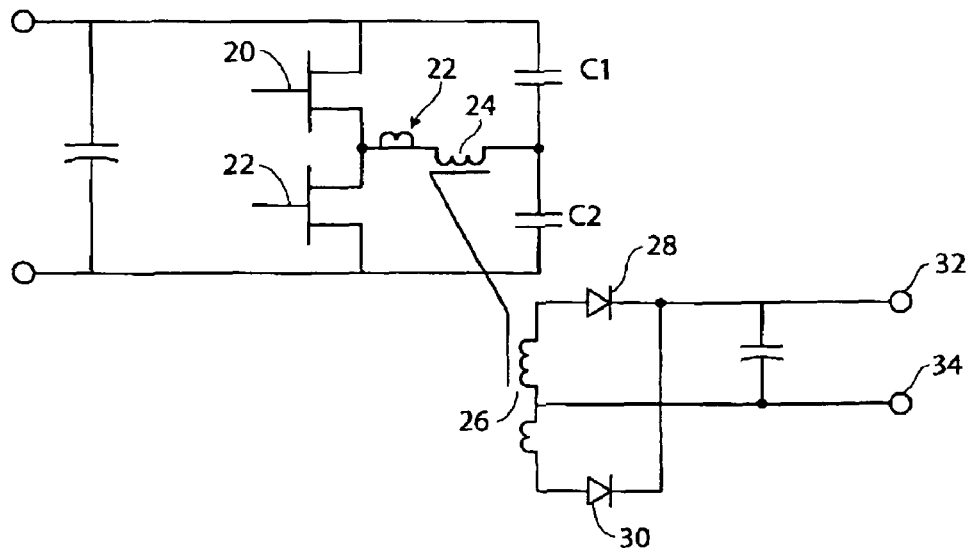
Figure 2:
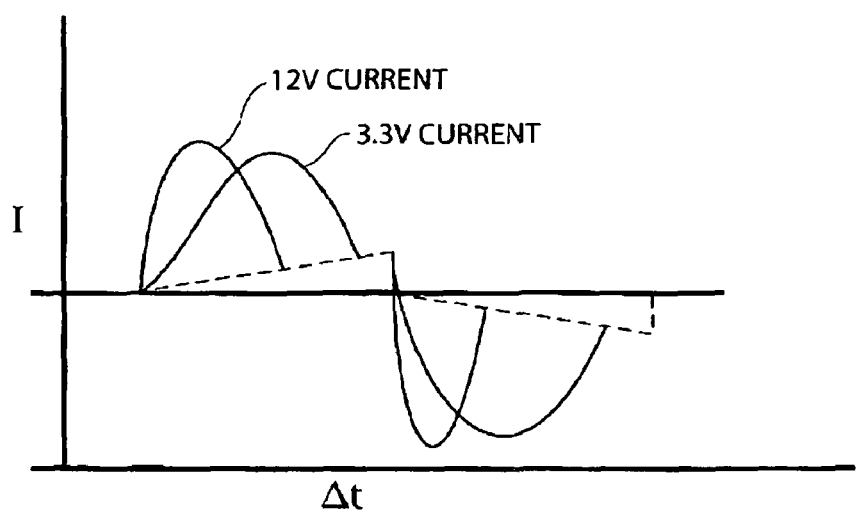
Figure 3:
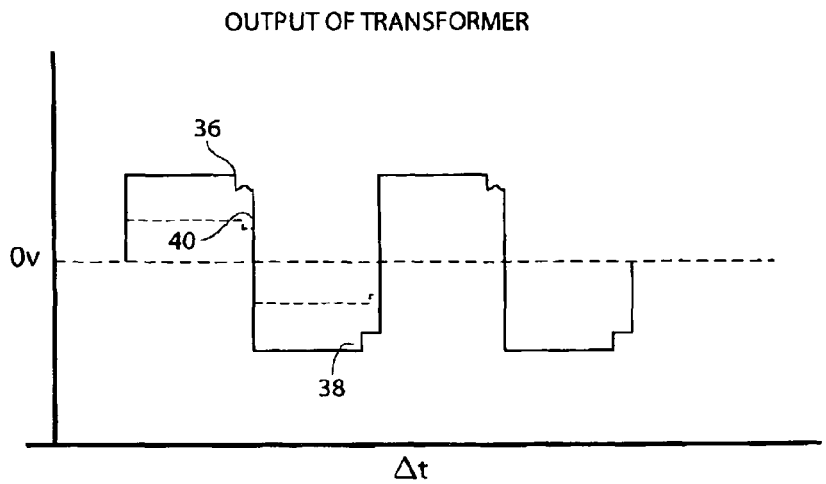
Figure 4:
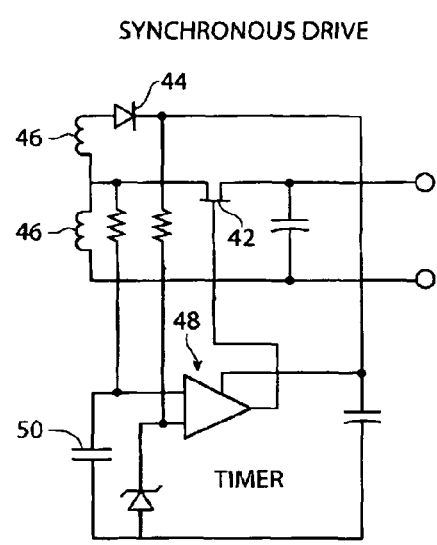
Figure 5:
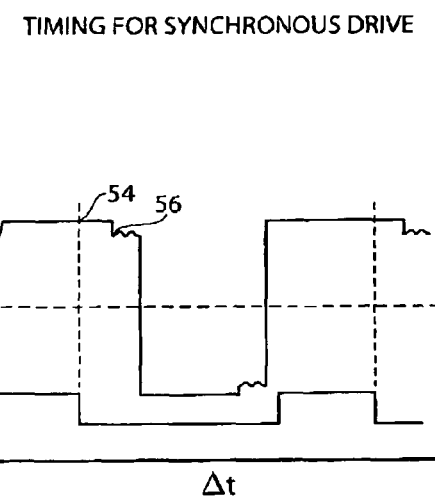
Figure 6:
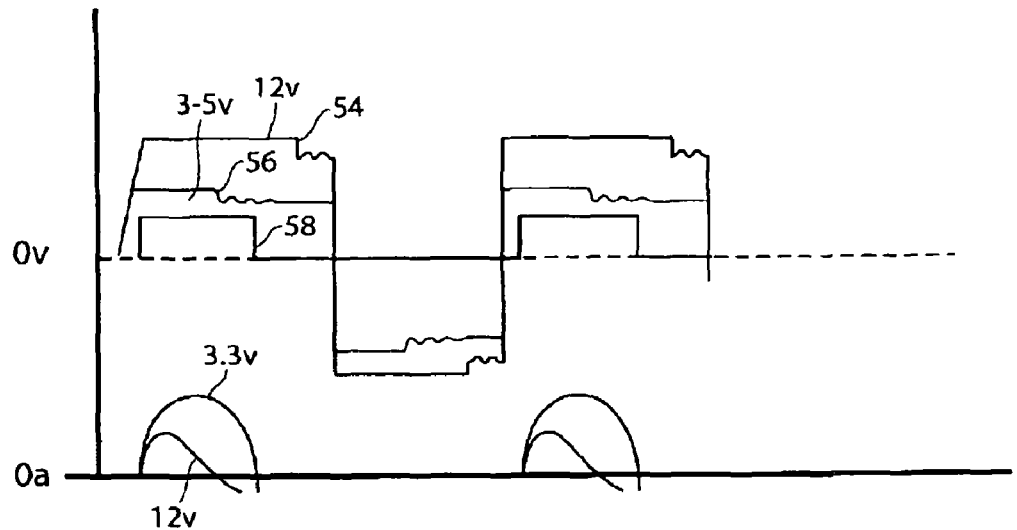
Figure 7:
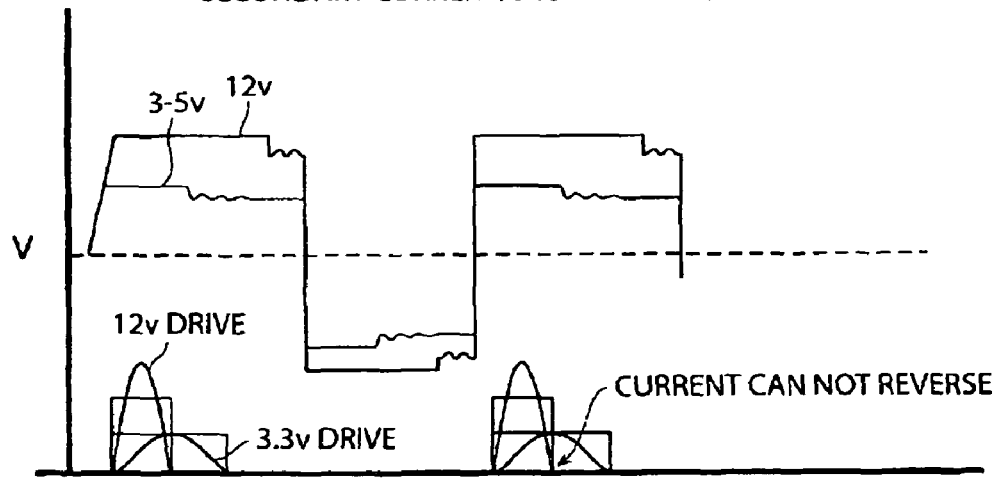
Figure 8:
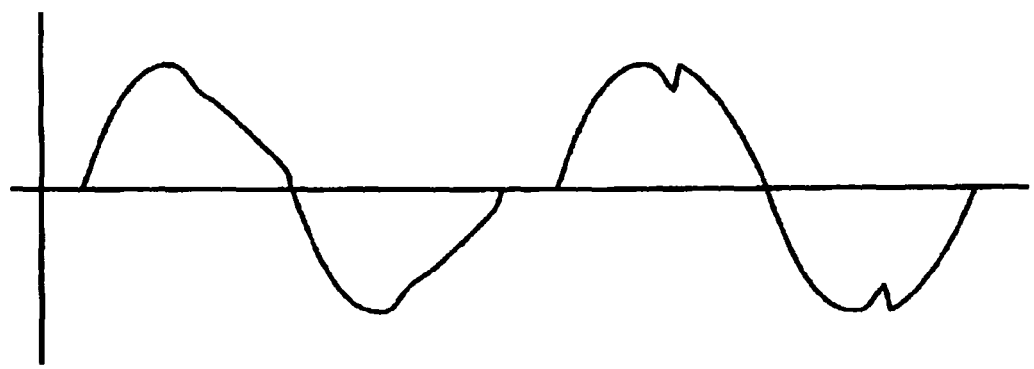
Figure 9:
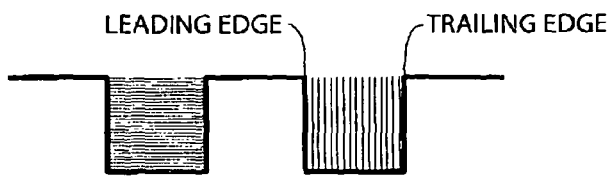
Figure 10:
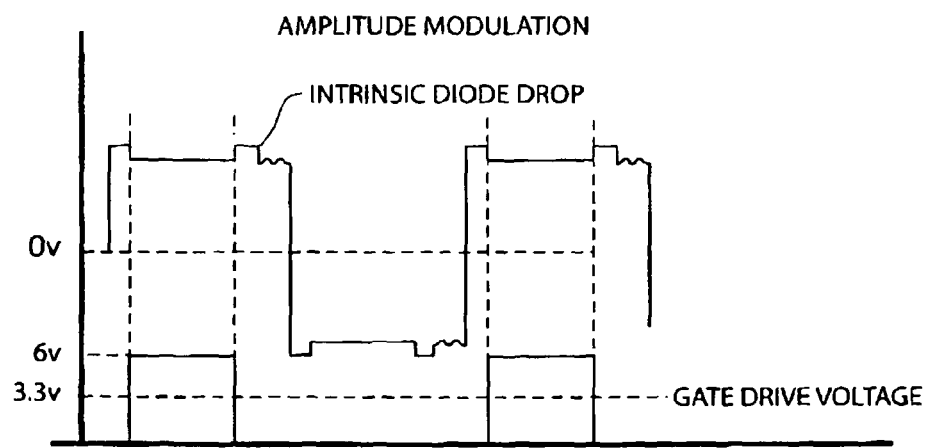
Figure 11:
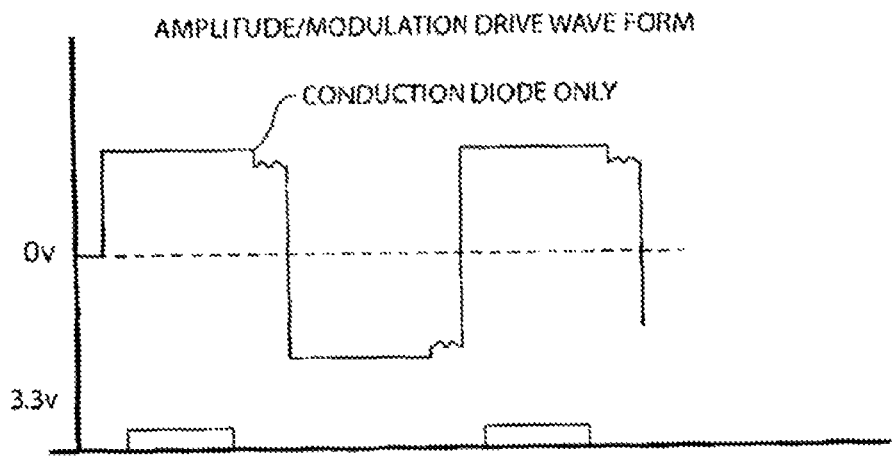
Figure 12:
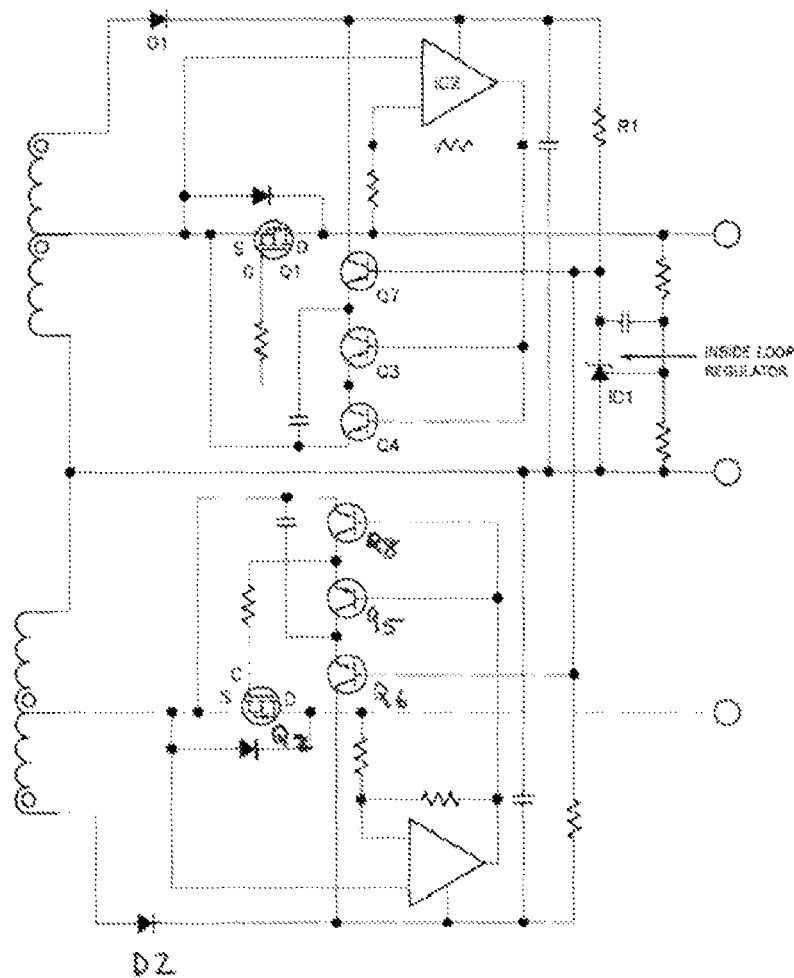

Having thus described the invention in general terms, reference will now be made to the accompanying drawings in which:

FIG. 1 is a schematic circuit view of a prior art DC to DC resonance converter;

FIG. 2 is a schematic wave form diagram showing current wave forms representing signals flowing through a pair of loaded windings;

FIG. 3 is a schematic wave form diagram showing the output of transformer voltage as a function of resonant frequency periods over time;

FIG. 4 is a schematic wave form diagram of a prior art synchronous drive and associated circuit arrangement;

FIG. 5 is a schematic wave form diagram showing the timing arrangement for synchronous Fets in the present invention and specifically showing matching of resonant time of a primary resonant circuit;

FIG. 6 is a schematic wave form diagram showing the resonant ending period when operating with a multiple output circuit of the prior art;

FIG. 7 is a schematic wave form diagram showing a synchronous circuit of the invention under the control of a modulation circuit and with effects of secondary voltage and secondary current;

FIG. 8 is a schematic wave form diagram showing a composite primary current reflected in a primary of the converter;

FIG. 9 is a schematic wave form diagram showing the effects of trailing edge modulation and the effects of amplitude modulation in accordance with the invention;

FIG. 10 is a schematic wave form diagram showing the operating voltage as a function of a gate drive voltage with a saturated FET channel;

FIG. 11 is a schematic wave form diagram showing an amplitude modulation drive wave form; and FIG. 12 is a schematic circuit diagram showing a preferred resonant converter circuit in accordance with the present invention.

DETAILED DESCRIPTION OF A PREFERRED EMBODIMENT

As previously described, the new invention utilizes a new and novel technique to allow a resonant circuit to remain in a synchronized state, regardless of the fact that there is only one transformer, and regardless of the fact that the reflected leakage inductance is varying by an order of over two to one. This is accomplished by utilizing a new technique called trailing edge modulation.

In this new trailing edge modulation technique, each of the outputs, e.g., the 3.3 Volts, the 5 Volts, or the 12 Volts has a circuit that terminates the operation of the synchronous field effect transistors (Fet's), when the current in the synchronous field effect transistor begins to turn negative, regardless of the load. This means that the cross-load can be any combination, heavy 3.3 and light 12 Volt, or heavy 12 Volt and light 3.3 Volt. Still, the primary current remains a composite sine wave made up of each independent frequency reflected from the secondary, thus remaining in regulation and substantially sinusoidal at all times.

In FIG. 1 illustrates a typical prior art resonant circuit arrangement which is comprised of a pair of field effect transistors 20 and 22 and which are connected with capacitors $C_1$ and $C_2$ connected there-across. A transformer having coupled inductors 24 and 26 are also connected through diodes 28 and 30 to positive ground terminals 32 and 34, in the monitor as best shown. This was one form of conventional resonant circuit arrangement which was used in the prior art and is representative of a number of prior art resonant circuit arrangements.

FIG. 2 depicts the current waveforms flowing through the prior art circuit depicted in FIG. 1, and showing the different resonant frequencies, although properly blocked via use of conventional diodes 28 and 30, as shown in FIG. 1.

In an older style resonant converter utilizing diodes in the secondary, the single transformer design would be capable of supplying multiple output voltages, since the diodes would naturally terminate the current when the voltage crossed the point where the output capacitor voltage was charged. This is demonstrated by the waveforms in FIG. 3. The 12 Volt resonant period would end at the points 36 and 38 in the voltage wave form of FIG. 3. In like manner, the 3.3 Volt resonant period would also end at the point 40 in the wave form of FIG. 3.

The synchronous field effect transistors are now being used for rectification in this invention and they form a resonant loop. It is now possible to add an amplitude modulation loop to the synchronous Fet drive without disturbing their resonant loop. This allows this new inner loop, that is the amplitude modulation loop, to control the light load regulation by modulating the channel resistance of the synchronous Mosfet transistors from their fully saturated resistance of about six milliohms, to a maximum voltage drop of one diode, and that is the intrinsic body diode of the Mosfet transistor. This added loop greatly enhances the cross regulation characteristics of the new invention for virtually free, since the synchronous drive is already available to allow proper rectification of the current.

The primary winding of the resonant circuit operates the same as previous generations of single output resonant public domain resonant converters in that there is one set of resonant capacitors and one resonant transformer. A schematic of prior art and public domain resonant design is shown in FIG. 1, as aforesaid. The primary resonant capacitors (C1 and C2 in FIG. 1) are tuned to the primary leakage inductance, shown as a discreet inductor in series with the transformer ($L_1$).

The frequency of the resonant circuit can be calculated by the equation, F=2pi multiplied by the square root of LC, F=2pi divided by LC, $F=2pi\sqrt{LC}$. The C in the equation is the parallel combination of the resonant capacitors C1 and C2. The L in the equation is an inductance, called primary reflected leakage inductance, which is the result of un-coupled inductance in the transformer that exists between the primary winding and any of the secondary windings. Since this uncoupled inductance increases the larger primary to the smaller secondary turn's ratio, the lower the number of primary turns, the higher will be the resonating inductance.

In FIG. 2, an example of the primary current is shown where there are two windings on the secondary of the transformer of different turn's ratio. FIG. 2 shows the current waveforms flowing through the primary winding for a loaded 12 Volts winding and a loaded 3.3 Volts winding.

In the current diagram of FIG. 2 in which the current is a function of time, the 3.3 Volt reflected leakage is equal to about 500 uh. The 12 Volt reflected leakage is about 250 uh. It should also be recognized that the 3.3 Volt winding and 12 Volt winding have differing numbers of turns.

In a high efficiency resonant converter, the output stages are not diodes, but synchronous field effect transistors (Fet's). The prior art resonant converters utilized a fixed timing type of drive for the secondary synchronous Fet control (Prior Art-see FIGS. 4 and 5), as described above. This fixed timing type of control works by allowing the synchronous Fet's to turn on when the winding voltage is positive, and turns off the Fet's when the timing circuit times out. This timing is set to match the resonant time of the primary resonant circuit described above.

FIG. 4 illustrates a resonant circuit having a field effect transistor 42. A transistor 46 is also shown in circuit with the field effect transistor 42. In this case, there is shown a timer 48 including a timer circuit 48 with a capacitor 50 connected to the input of the transformer. This constitutes a typical type of prior art resonant frequency converter using a timing arrangement with a single output.

By reference to FIG. 5, it can be seen that in the prior art type of circuit, the timer 48 can actually turn off at the point 54 before the period ends at 56. This approach actually is quite effective for a single output design but is not at all effective and will typically fail when utilized with multiple secondary output designs. This is due to the different resonant frequencies reflected back to the primary when each output is loaded to varying degrees of load.

Subsequent reversing current can be seen in FIG. 6 when the prior art resonant converter circuit is operated with a multiple output type design and the prior art fixed timing resonant circuit. The resonant period for the 12 Volt signal ends at that region identified by reference number 56 and the resonant period for the 3 to 5 Volt signal ends at that region identified as 54. Moreover, the fixed time resonant period would end at that region identified as 58 in FIG. 6 of the drawings. This is due to that fact that in high efficiency multi-output resonant converters utilizing synchronous rectification, the intrinsic diode, although present in the Mosfet, can not block this reversing current since the channel of the Mosfet is on and carrying the current. Therefore, it is necessary to improve the converter to overcome this current flow problem, where if a single transformer design is to be utilized.

FIG. 7 shows the waveforms in the preferred embodiment, where the synchronous circuit is under control of the training edge modulation circuit. In this approach, each individual output has the drain voltage compared to the source voltage. This allows the operation of the synchronous FET to be terminated by each comparator monitoring the synchronous waveform.

A composite of the primary current is shown in FIG. 8, showing the various resonant currents reflected to the Primary of the converter caused by the independent termination of each discreet output circuit. This FIG. 8 actually shows the secondary current trailing edge as a function of time. It can be seen that there is no interruptions in the change in frequency in the curve on the left-hand side. In the waveform on the right-hand side, there is a reversing of the current, shown in prior art systems.

The trailing edge circuit works by comparing the drain voltage to the source voltage. By adding appropriate level shifting to overcome the comparator offset voltages, the circuit is able to independently turn off each Fet and preferably a Mosfet based on its individual inductance since the winding leakage inductance for each Mosfet determines when the current will attempt to reverse, which occurs when the voltage on the drain of each Fet attempts to cross negative with respect to the source of the Mosfet.

Under light load conditions, the voltage in the output capacitor can be driven above the regulation point of the converter simply due to the input to output impedance of the power supply. In this case, the resonant frequency circuit of the invention can take advantage of the fact that the intrinsic diode is present in every Mosfet transistor.

If the gate voltage is dropped to a level below the gate threshold, the Mosfet transistor will enter a linear resistive region; if it continues to drop, the field effect transistor will eventually become a simple diode since the channel resistance will present a very high impedance and thus be in a blocking state. The difference between the saturated Fet (Gate above Rdson point shown in FIG. 10) to the point where the Fet is off and the diode is conducting (FIG. 11) constitutes a voltage drop of at least 0.5 volts. This dynamic range becomes a valuable regulation band that improves the performance of the converter under light load conditions, making the cross regulation superior to conventional converters.

FIG. 12 shows a detailed schematic for a preferred resonant frequency converter circuit of the invention. The secondary synchronous Fet, $Q_1$ and $Q_2$ is driven to a defined conduction state by a low impedance buffer comprised of Mosfet switching transistors $Q_3$, $Q_4$ and $Q_5$ and $Q_6$. The buffers, one for each Fet, are fed a regulated maximum positive voltage with respect to each source, by the emitter follower arrangement of Fets $Q_7$ and $Q_8$. The voltage is controlled by an error amplifier set to regulate the output voltage to a predetermined value. As the amplifier detect a voltage rising above its threshold, the base of $Q_7$ and $Q_8$ is pulled to a lower voltage until the synchronous Fet, $Q_1$ is operating in its linear region. With this action, the regulation of the output through the modification of the gate voltage can continue until the Fet, $Q_1$ is no longer biased on by the driver which is operating as a diode, only through the action of its intrinsic diode effects.

For simplification, only one-half of the actual circuit is shown in FIG. 12, and the remaining half, namely a lower half of FIG. 12 would constitute a true mirror image of FIG. 12. Thus, and in this case modification of the gate voltage will continue until the gate voltage of the Fet $Q_1$, and a corresponding Fet (not shown) was no longer biased by the driver as shown, along with a corresponding driver for the not shown Fet.

The synchronous diode, $D_1$ and a corresponding diode (not shown), is also gated on and off by the gating comparator $IC_2$ and a corresponding gating comparator (not shown). These comparators detect the state of the current flowing in the Mosfets $Q_1$ comparing the voltage present on the drain to the voltage present on the source. By turning on the Fet $Q_1$ and a corresponding Fet, whenever the drain is positive to the source, the Fets will, be properly phased to the resonant tank operating on the primary, regardless of the reflected inductance since the comparator $IC_2$ responds only to the particular Fet it is monitoring. The diodes $D_1$ and $D_2$ and resistors $R_1$ and $R_2$ are used to allow proper offset for the comparators.

It can be observed that the means for measuring and for monitoring the status of the drain voltage compared to the source in this case would include the comparator such as the integrated circuit chip $IC_2$ and the corresponding integrated circuit chip $IC_3$, which also operates as a comparator. In addition, these camparators would, also along with the additional transistors $Q_3$ and $Q_4$, as well as the additional transistors (not shown), provide a resonant timing of the secondary circuit by using the monitored status of the drain as compared to the source voltage. In effect, these means for independently monitoring use field effect transistors and more preferably those Mosfet transistors, $Q_3$ and $Q_4$.

One of the important results with the resonant frequency converter of the invention is that even with a plurality of load conditions, as for example, 20%, 50%, 70% and even 100%, with a single transformer, the converter still provides operation above an 80% efficiency. In other words, even if there are loads, that is, output voltages which are equivalent to 100% of the input voltage signals, the converter of the invention will still achieve at least an 80% efficiency.

Thus, there has been illustrated and described a unique and novel multiple voltage DC to DC resonant converter which is a unitary transformer operated resonant converter, and which thereby fulfills all of the objects and advantages which Shave been sought. It should be understood that many changes, modifications, variations and other uses and applications which will become apparent to those skilled in the art after considering the specification and the accompanying drawings. Therefore, any and all such changes, modifications, variations and other uses and applications which do not depart from the spirit and scope of the invention are deemed to be covered by the invention.

Having thus described the invention, what I desire to claim and secure by Letters Patent is:

1. A resonant converter capable of operation with a high degree of efficiency regardless of load conditions of up to 100% while utilizing a single power transformer having a plurality of outputs, said resonant converter comprising:
   a) a resonant frequency converter containing the transformer, wherein at least one of the plurality of outputs of the transformer has a reflected frequency inductance different from at least one other of the outputs;
   b) means for modulating a trailing edge of the outputs of the transformer so that the outputs remain in regulation and are substantially sinusoidal; and
   c) means for modulating the amplitude of the current to obtain a regulated converter without need for a separate regulating circuit.

2. The resonant converter of claim 1 further characterized in that said converter further comprises:
   a) only one transformer; and
   b) the output of the transformer comprises a plurality of independent outputs and each one of the outputs are of a different voltage signal from any other output of the one transformer.

3. The resonant converter circuit of claim 2 further characterized in that said converter comprises:
   a) at least one field effect transistor;
   b) a separate driver for each transistor; and
   c) a separate comparator circuit for each transistor, and which thereby provides a separate timing signal for each transformer output.

* * * * *